United States Patent
McCauley et al.

(10) Patent No.: US 9,564,726 B2
(45) Date of Patent: Feb. 7, 2017

(54) ELECTRICAL DISTRIBUTION SYSTEM

(71) Applicant: Powerbar Limited, Burnfoot, County Donegal (IE)

(72) Inventors: Damian Martin McCauley, Burnfoot (IE); Cathal Diarmuid McLaughlin, Burnfoot (IE); Karol Angelo McDermott, Moville (IE); Stephen James Milton Kerr, Killaloo (GB)

(73) Assignee: Powerbar Limited, Burnfoot, County Donegal (IE)

( * ) Notice: Subject to any disclaimer, the term of this patent is extended or adjusted under 35 U.S.C. 154(b) by 148 days.

(21) Appl. No.: 14/698,369

(22) Filed: Apr. 28, 2015

(65) Prior Publication Data

US 2015/0311654 A1    Oct. 29, 2015

(30) Foreign Application Priority Data

Apr. 28, 2014  (GB) .................................. 1407454.6

(51) Int. Cl.
| | |
|---|---|
| *H01R 25/14* | (2006.01) |
| *H02G 5/08* | (2006.01) |
| *H01H 9/22* | (2006.01) |
| *H01H 1/58* | (2006.01) |

(52) U.S. Cl.
CPC .............. *H01R 25/142* (2013.01); *H02G 5/08* (2013.01); *H01H 1/5866* (2013.01); *H01H 9/22* (2013.01)

(58) Field of Classification Search
CPC .................................................. H01R 25/142
See application file for complete search history.

(56) References Cited

U.S. PATENT DOCUMENTS

| | | | |
|---|---|---|---|
| 2,903,503 A * | 9/1959 | Carlson .................... | H02G 5/06 174/16.2 |
| 2,970,245 A | 1/1961 | Weimer et al. | |
| 3,052,768 A | 9/1962 | Kuhar et al. | |
| 3,716,683 A * | 2/1973 | Hafer ....................... | H02G 5/08 200/50.02 |
| 3,910,667 A | 10/1975 | Heritage | |
| 9,450,359 B2 * | 9/2016 | Rathjen .................... | H02G 5/08 |
| 2011/0261508 A1 * | 10/2011 | Ross ....................... | H01R 25/14 361/624 |

(Continued)

FOREIGN PATENT DOCUMENTS

GB              800573              8/1958

*Primary Examiner* — James Harvey
(74) *Attorney, Agent, or Firm* — Gardner, Linn, Burkhart & Flory, LLP

(57) ABSTRACT

An electrical distribution system comprising at least one busway section comprising an elongate trunking, a plurality busbars being disposed within the trunking, a respective elongate opening formed in a mounting face of the busway section permitting a respective male busbar engaging contact to engage the respective busbar, the system further comprising at least one tap off unit comprising a housing arranged to be mounted on the busway section, abutting the mounting face thereof, at any desired location along the length of the busway section, the at least one tap off unit having a plurality of conductive busbar engaging male contacts, the contacts being moveable between a retracted position, wherein the contacts are located within the housing, and an extended position, wherein the contacts extend out of the housing to engage a respective busbar via the elongate openings.

20 Claims, 17 Drawing Sheets

(56) References Cited

U.S. PATENT DOCUMENTS

2015/0236462 A1* 8/2015 Davidson, Jr. ....... H01R 25/142
439/122
2015/0311654 A1* 10/2015 McCauley ............... H02G 5/08
439/122
2016/0020053 A1* 1/2016 Dozier ..................... H02P 1/26
200/50.21

* cited by examiner

ELECTRICAL DISTRIBUTION SYSTEM

FIELD OF THE INVENTION

The present invention relates to an electrical distribution system of the kind comprising a plurality of conductive busbars mounted within protective trunking to define a busway, and at least one tap off unit arranged to engage the busway to define spur connections to the busbars.

BACKGROUND OF THE INVENTION

A typical electrical distribution system for distributing electrical power comprises a plurality of busbars, each comprising an electrically conductive strip, typically formed from copper, brass or aluminium, arranged side-by-side and spaced apart from each other in a direction transverse to their lengths, the busbars being separated by and supported on insulators a suitable intervals. The busbars and insulators are usually enclosed within protective trunking, defining a busway.

Openings or removable covers are typically provided at spaced locations along the length of the trunking to define tap off points, whereby tap off units may be coupled to the trunking at such tap off points to make a spur connection with the busbars.

Such electrical distribution systems allow new circuits to branch off at selected locations along the route of the busway. A number of busway sections may be coupled together to form an electrical distribution system (often referred to as a "power track") of indefinite length. A common use for such systems is in an office, factory or other commercial setting where a number of electrical connection points are required, and further, where the configuration and desired location of connection points (tap off points) is likely to change from time to time. Typically, such power tracks are located overhead to provide a convenient and adaptable source of electricity for lights, machines and other electrical devices in a building.

A problem with such known systems is that such predefined tap off points along the busway sections limit the locations at which such spur connections may be made. Furthermore, it is usually necessary to cut power to the entire power track before making new connections to avoid the risk of electrocution, because such process usually requires the removal of covers from the trunking, exposing the busbars therein.

The main object of the present invention is to provide an improved electrical distribution system for effecting rapid electrical connection of a tap off unit to the busbars at any desired location along the busway sections in a safe and reliable manner.

SUMMARY OF THE INVENTION

According to a first aspect of the present invention, there is provided an electrical distribution system comprising at least one busway section comprising an elongate trunking, a plurality of linear busbars being disposed within the trunking, the busbars being supported in spaced parallel relationship to one another, each busbar being aligned with a respective elongate opening formed in a mounting face of the busway section permitting a respective male busbar engaging contact to engage the respective busbar, the system further comprising at least one tap off unit comprising a housing arranged to be mounted on the busway section, abutting the mounting face thereof, at any desired location along the length of the busway section, the at least one tap off unit having a plurality of electrically conductive busbar engaging male contacts, the contacts being moveable between a retracted position, wherein the contacts are located within the housing of the tap off unit, and an extended position, wherein the contacts extend out of the housing of the tap off unit to engage a respective busbar via the elongate openings.

Preferably the busbars are mounted within one or more electrically insulating bodies located within the busway section.

Preferably the at least one tap off unit is adapted to be mounted on the busway section to be supported thereon. Preferably the at least one tap off unit is provided with one or more retaining members for engaging the busway section. Preferably at least one of the retaining members is moveable between a release position, wherein the tap off unit can be attached to and detached from the busway section, and an operative position, wherein the tap off unit is secured to the busway section by means of the retaining members.

In one embodiment the at least one tap off unit may comprise a first retaining member located at or adjacent a first lateral side of the tap off unit, the first retaining member being adapted to engage a first retaining channel formed in the busway section at or adjacent a first lateral side thereof, and a second retaining member located at or adjacent a second lateral side of the tap off unit opposite the first lateral side, the second retaining member being adapted to engage a second retaining channel formed in the busway section at or adjacent a second lateral side thereof, opposite the first lateral side, at least one of the first and second retaining members being moveable between a release position, wherein the respective retaining member is spaced from the respective retaining channel, and an operative position, wherein the respective retaining member engages the respective retaining channel to retain the tap off unit in engagement with the busway section.

The first retaining member may be fixed with respect to the tap off unit, the second retaining member being moveably mounted on the tap off unit to be moveable laterally between the release and operative positions.

The first retaining member and the cooperating first retaining channel may be shaped such that the tap off unit must be tilted with respect to the busway section to permit the insertion of the first retaining into or out of the first retaining channel. Preferably the first retaining member comprises an elongate flange adapted to engage the first retaining channel of the busway section. Preferably the flange is curved laterally towards the first lateral side of the busway section so that the tap off unit must be tilted with respect to the busway to initially insert the flange into the first retaining channel, the first retaining channel extending laterally towards the first lateral side of the busway section to allow the flange to enter into the first retaining channel as the tap off unit is rotated and raised into abutment with the mounting face of the busway section.

Preferably the first retaining member forms an earth connection between the tap off unit and the busway section.

In one embodiment said at least one moveable retaining member may be provided on a laterally sliding plate mounted on or adjacent an outer face of the tap off unit, the plate having apertures formed therein, the apertures being aligned with one or more of the male contacts when the retaining member is in its operative position, such that the one or more male contacts may extend through the apertures when moving from their retracted to their extended positions, the apertures being positioned out of alignment with the one or more male contacts when the retaining member is in its release position, preventing extension of the male contacts from their retracted to their extended positions.

In one embodiment the male contacts may be moveable between their retracted and extended positions by means of a lever coupled to a cam mechanism engaging the male contacts.

The busway section may comprise a casing comprising an upper side and opposed lateral sides, a plurality of substantially parallel ribs depending from an inner face of the upper side to extend between the busbars, such that each busbar is located between a respective adjacent pair of the ribs. Preferably each rib has an enlarged head portion at a distal end thereof for retaining respective insulating bodies within the casing within which the plurality of busbars are mounted to be electrically insulated from the casing, the insulating bodies having lower openings defining the elongate openings of the busway section.

BRIEF DESCRIPTION OF THE DRAWINGS

Preferred embodiments of the present invention will now be described, by way of example only, with reference to the accompanying drawings, in which.

DETAILED DESCRIPTION OF THE EMBODIMENTS

Figure 1:
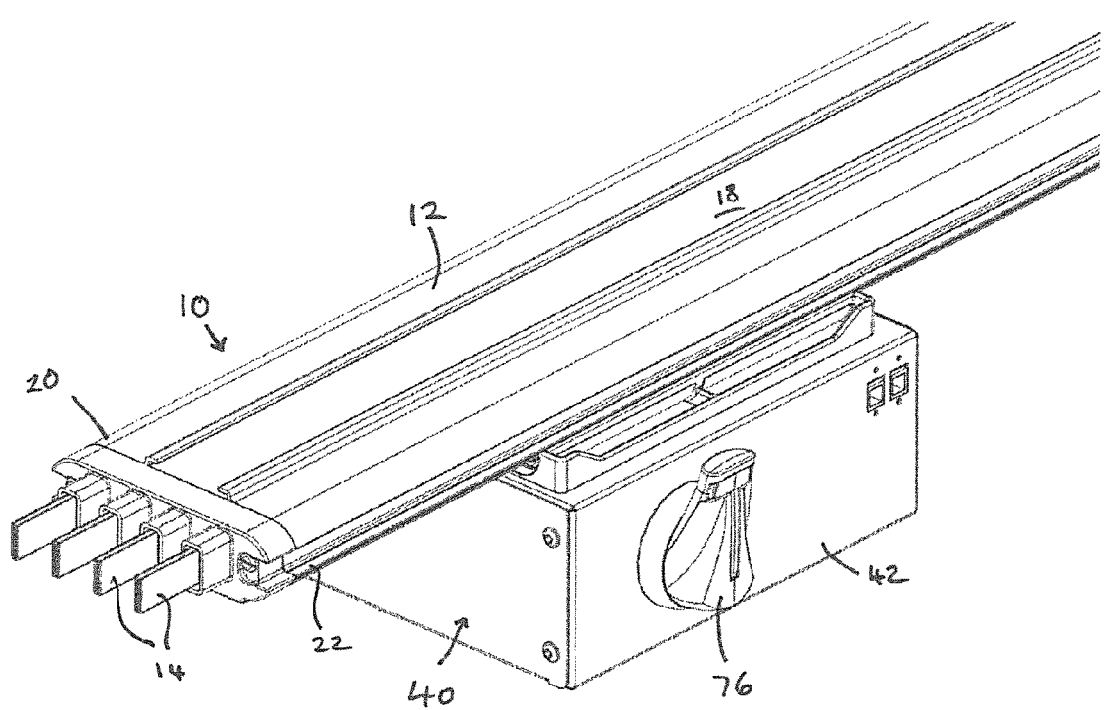
FIG. 1 is perspective view of an electrical distribution system in accordance with a first embodiment of the present invention.
Figure 2:
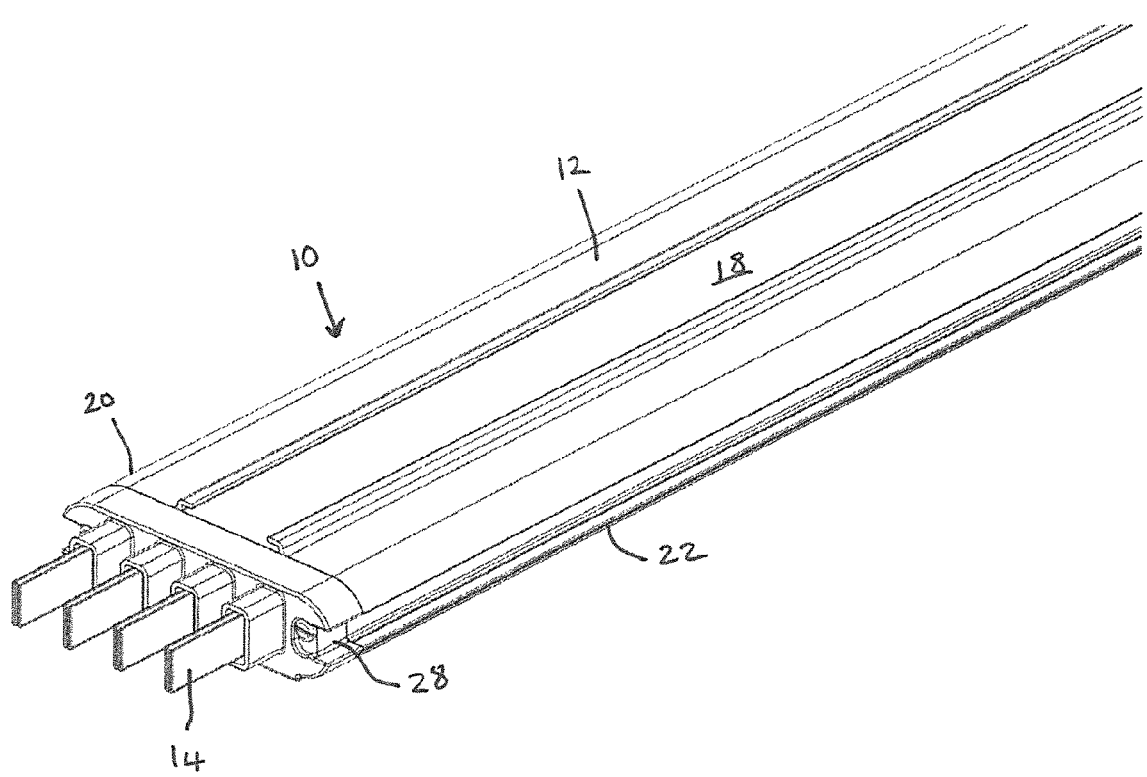
FIG. 2 is perspective view of a busway section of the electrical distribution system of FIG. 1.
Figure 3:
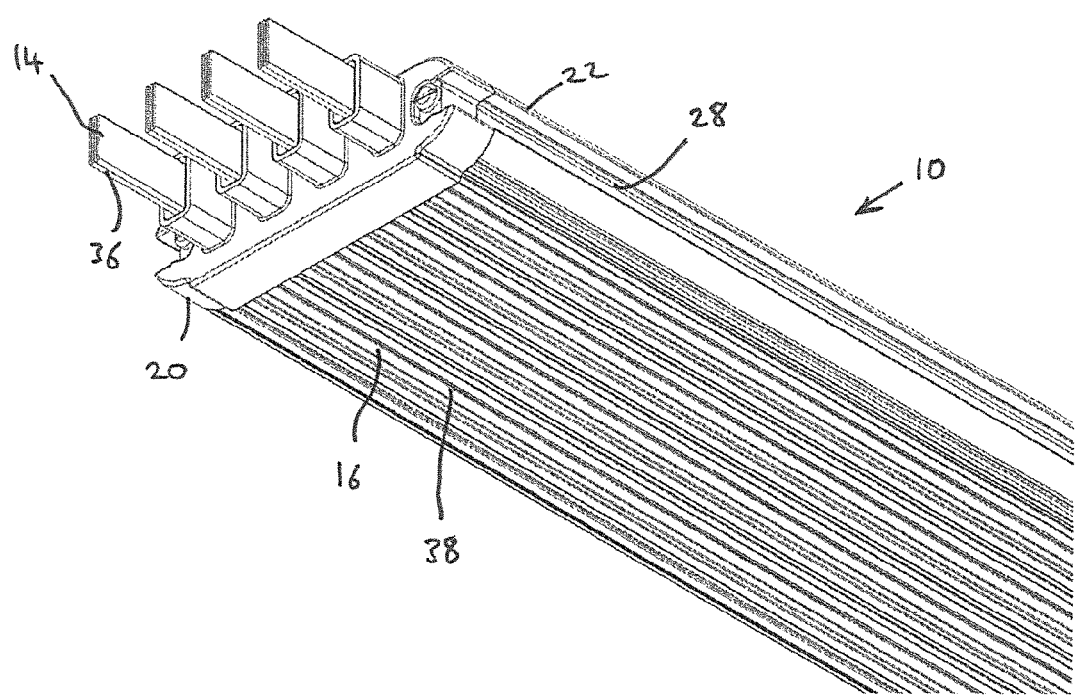
FIG. 3 is a perspective view from below of a busway section of the electrical distribution system of FIG. 1.
Figure 4:
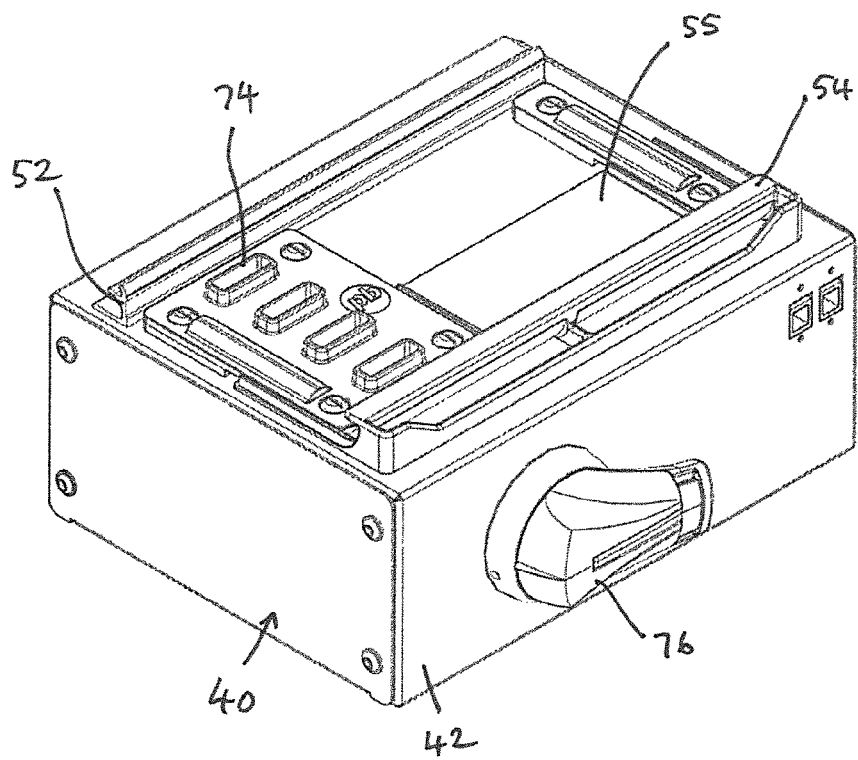
FIG. 4 is a perspective view of a tap off unit of the system of FIG. 1.

As illustrated in the drawings, an electrical distribution system in accordance with an embodiment of the present invention comprises a power track formed from a plurality of busway sections 10 connected together in end to end relationship for distributing electrical power around a building or room.

Figure 5:
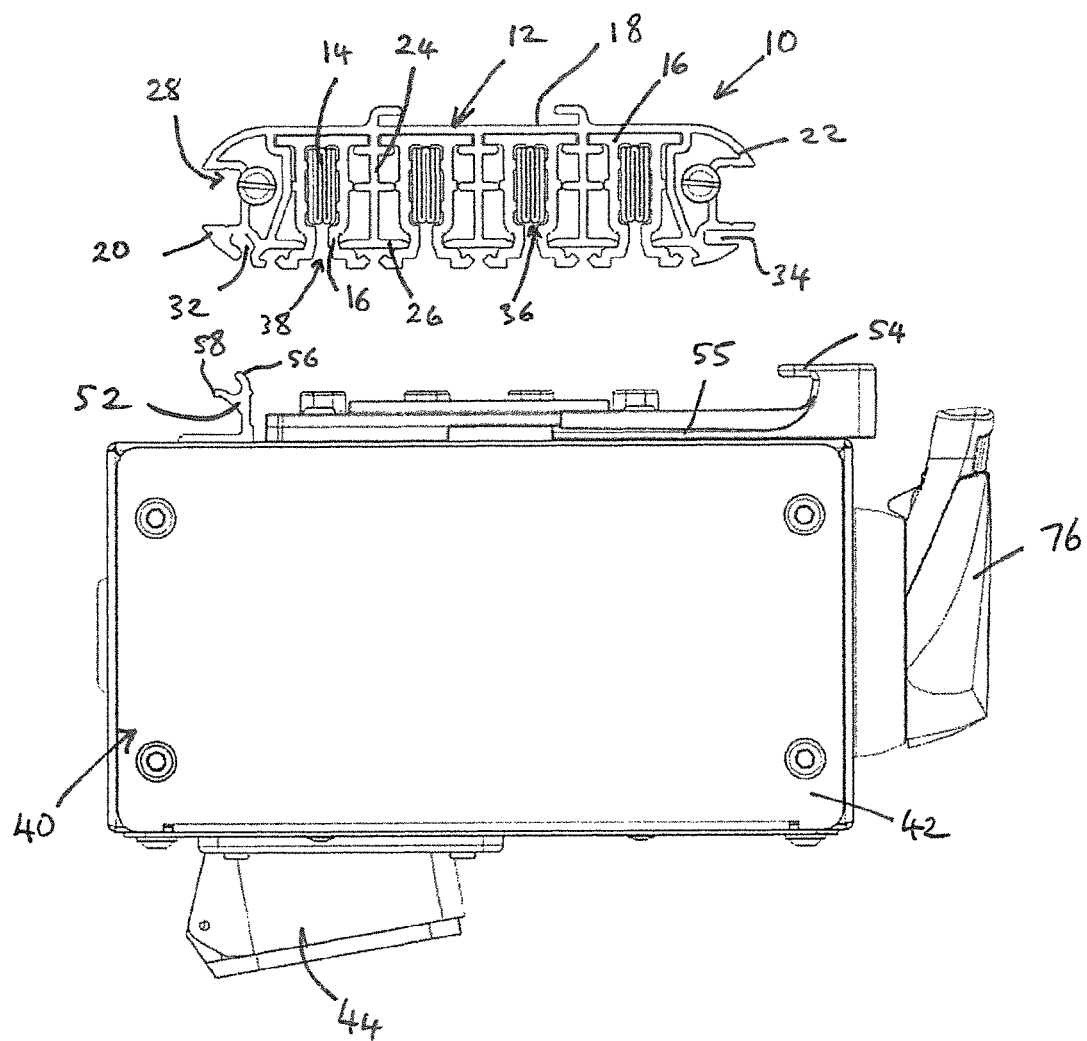
FIG. 5 is a sectional view through a busway section of the electrical distribution system of FIG. 1 with a tap off unit spaced therebelow.

Each busway section 10 comprises a protective casing 12 within which is located a plurality of parallel linear busbars 14 arranged side-by-side and spaced apart from each other in a direction transverse to their lengths, the busbars 14 being separated by and supported within one or more electrically insulating bodies 16, formed from an electrically insulating material, such as a plastic or composite material, located within the casing 12 (see FIG. 5). The casing 12 may be formed by an extrusion process and may be formed from a metal, such as aluminium or steel.

As best shown from FIG. 5, the casing 12 comprises a continuous upper side 18 and opposed lateral sides 20,22. A plurality of internal ribs 24 may depend from an inner face of the upper side 18 of the casing 12, each rib 24 preferably having an enlarged head portion 26 for retaining said one or more insulating bodies 16 within the casing 12 and for separating the busbars 14 from one another.

A recess 28 may be formed on each lateral side 20, 22 of the casing 12, within which recess 28 may be located a light emitting device (not shown), such as a fluorescent strip light or a plurality of LEDs. Each recess 28 may be covered by a clear or translucent cover strip (not shown), allowing the busway sections 10 to be used as a light source within the building or room within which they are installed.

Each busbar 14 comprises an elongate conductive strip, formed from copper, aluminium or any other suitable electrically conductive material, preferably folded to define a W shaped cross section defining a downwardly facing central slot 36 for receiving a respective male contact of a tap off unit secured to the lower face of the busway 10, as will be described below in more detail. Alternatively, each busbar 14 may be formed from an inverted U shaped cross section to define said downwardly facing central slot.

Relatively narrow elongate openings 38 are defined in a lower face of each insulating body 16, each opening 38 being aligned with the central slot 36 of a respective busbar 14, to allow respective male contacts of a tap off unit 40 to engage and make electrical contact with the busbars 14 when the tap off unit is coupled to the busway section 10 at any desired location along the length of the busway section 10.

The electrical distribution system includes a plurality of tap off units 40 adapted to be mounted on the busway sections 10 at any desired location along the length thereof to define a spur connection with the busway sections 10. Slots 32, 34 are formed in the lateral sides 20, 22 of the casing 12, below said recesses 28, for receiving respective retaining flanges 52, 54 of a locking mechanism of each tap off unit 40 to secure the tap off unit 40 to the busway section 10, as will be described below in more detail.

Each tap off unit 40 comprises a box like housing 42 having an electrical plug 44 on a lower side thereof, for connection to an electrical load, and a locking mechanism on an upper side of the tap off unit 40 for securing the tap off unit 40 to the busway section 10. A switch and/or circuit breaker may also be provided within the housing 42 of each tap off unit 40.

To secure each tap off unit 40 to a respective busway section 10, the locking mechanism of each tap off unit 40 comprises a first elongate retaining flange 52 extending from an upper face of the housing 42 of the tap off unit and adapted to engage a first elongate slot 32 formed in the first lateral side 20 of the casing 12 of the busway section 10 and a second elongate retaining flange 54 mounted on the upper face of the housing 42 and adapted to engage a second elongate slot 34 formed in the second lateral side 22 of the casing 12 of the busway section 10. At least one of the retaining flanges 52, 54 may be moveable between open and closed positions to allow the tap off unit 40 to be engaged with and locked onto the busway section 10.

In the embodiment shown in the drawings, the first elongate retaining flange 52 comprises an upwardly and outwardly facing U shaped channel having a first leg 56 adapted to enter the first elongate slot 32 in the casing 12 when the tap off unit 40 is engaged with the busway 10 and a second leg 58 adapted to abut a lower face of the outer side 20 of the casing 12.

As shown in FIGS. 6 to 9, the first leg 56 of the flange 52 is preferably curved laterally towards the side 20 of the busway section 10 so that the tap off unit 40 must be tilted/inclined with respect to the busway section 10 to initially insert the first leg 56 of the flange 52 into the first elongate slot 32. The slot 32 extends laterally towards the outer side 20 of the busway section 10 to allow the second leg 58 to enter into the slot 32 as the tap off unit 40 is rotated and raised into abutment with the lower face of the busway 10, the second leg 58 being shaped to engage the side 20 of the casing 12 of the busway section 10 to guide the movement of the first leg 56 into the slot 32.

Figure 6:
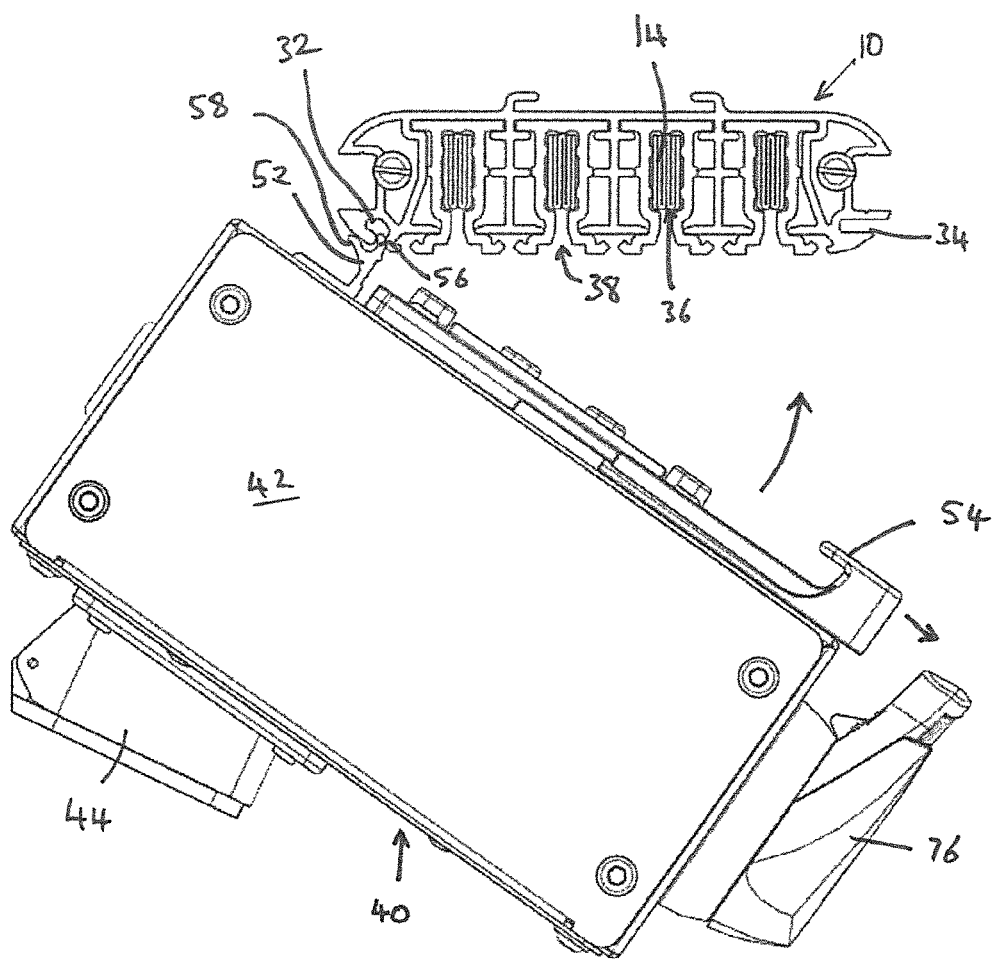
FIGS. 6 to 9 are sectional views of a busway section of the electrical distribution system of FIG. 1 showing the different stages of connection of a tap off unit to the busway section.
Figure 7:
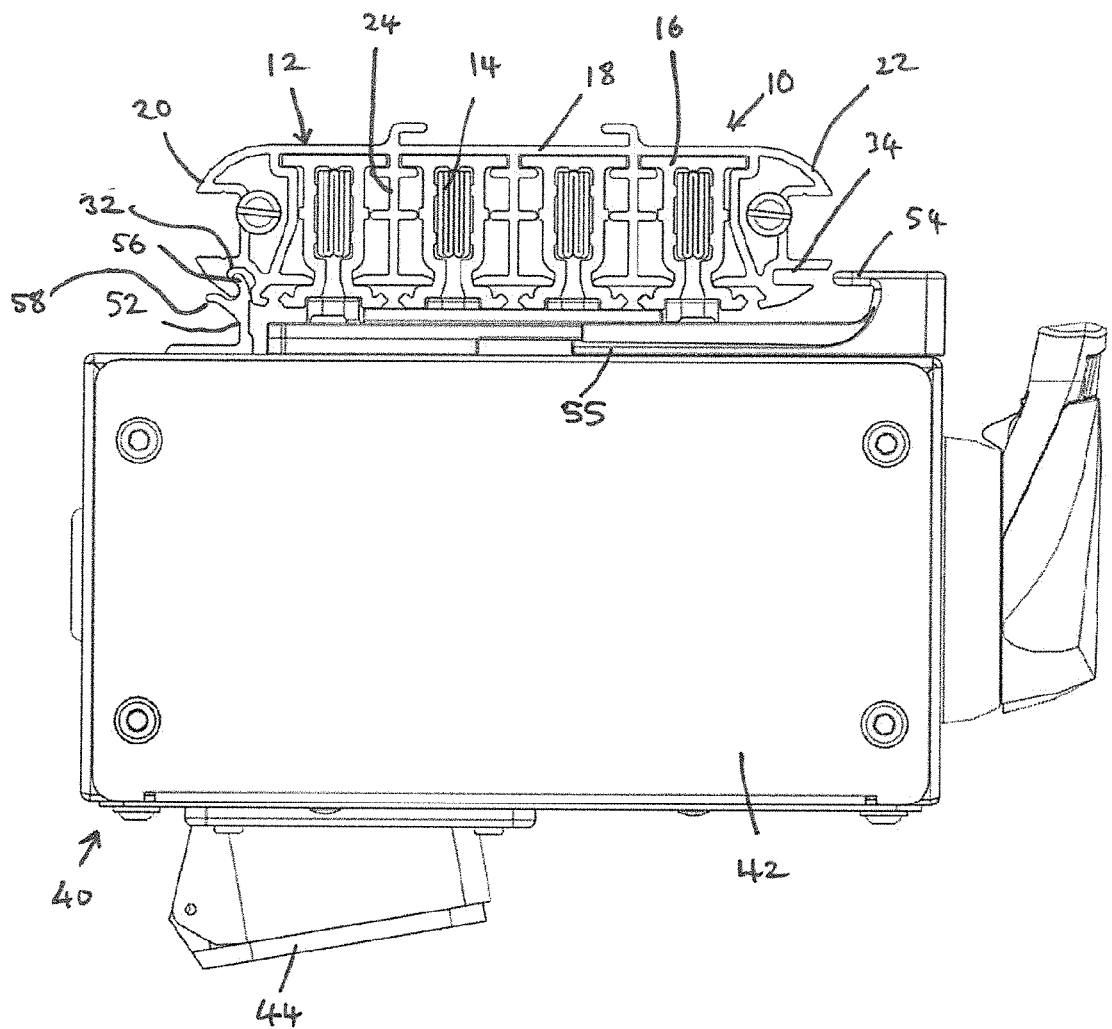
Figure 8:
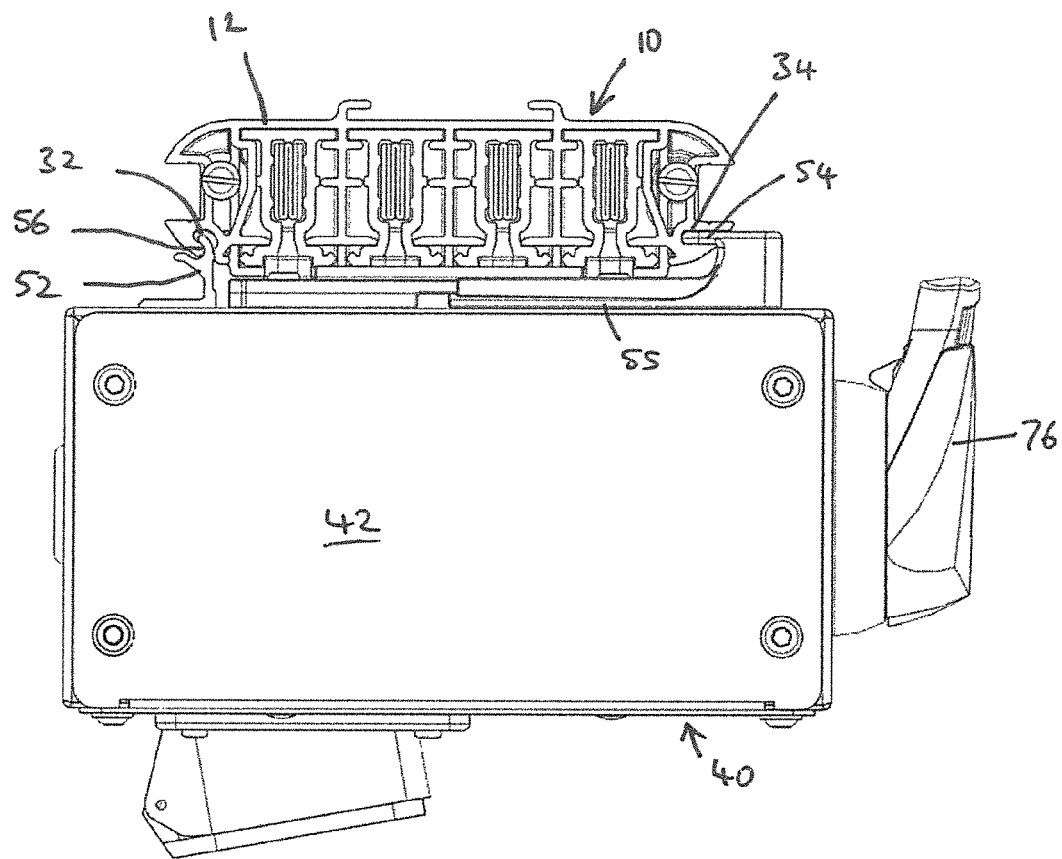

In the embodiment shown in the drawings, the second retaining flange 54 is provided on carrier plate 55, which is mounted to be laterally slidable between an upper face of the housing 42 of the respective tap off unit 40 and a top plate 50 thereof. The second retaining flange 54 defines a hook shaped member adapted to engage the receiving slot 34 formed in the side 22 of the casing 12 of the busway section 10 to retain the tap off unit 40 in engagement with the busway 10 once the first retaining flange 52 has been fully inserted into the first slot 32. The second retaining flange 54 is slidable laterally with respect to the housing 42 of the tap off unit 40 (and the respective busway section 10 to which it is attached) between an open position, as shown in FIGS. 5, 6 and 7, and a closed position, as shown in FIG. 8. In the open position, the retaining flange is laterally spaced from the second elongate slot 34 of the busway section 10 to allow the tap off unit 40 to be attached to and removed from the busway section 10 by tilting of the tap off unit 40 with respect to the busway section 10 to insert and remove the first retaining flange 52 from the first elongate slot 32 in the body 12 of the busway section 10. In the closed position, as shown in FIG. 8, both the first and second retaining flanges 52, 54 engage the respective receiving slots 32, 34 of the casing 12 of the busway section 10 to secure the tap off unit 40 in engagement with a respective busway section 10.

Figure 9:
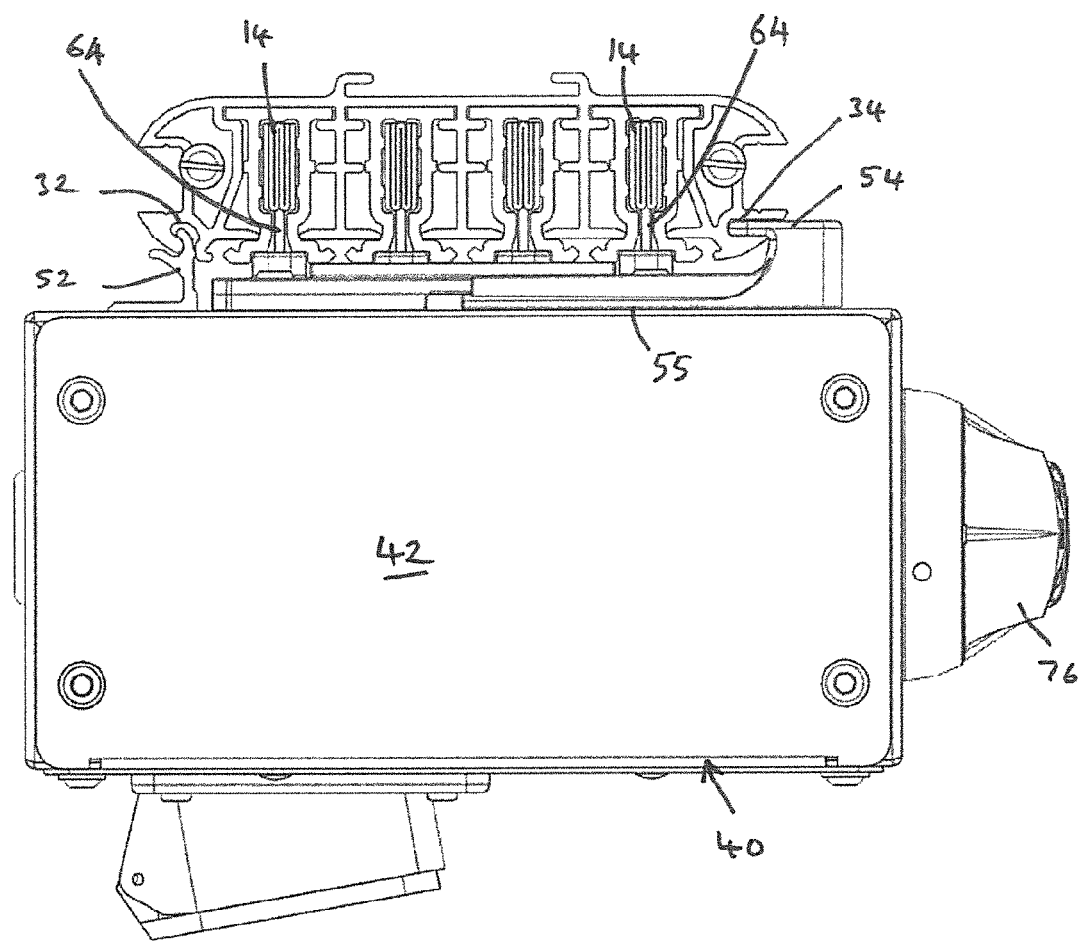
Figure 10:
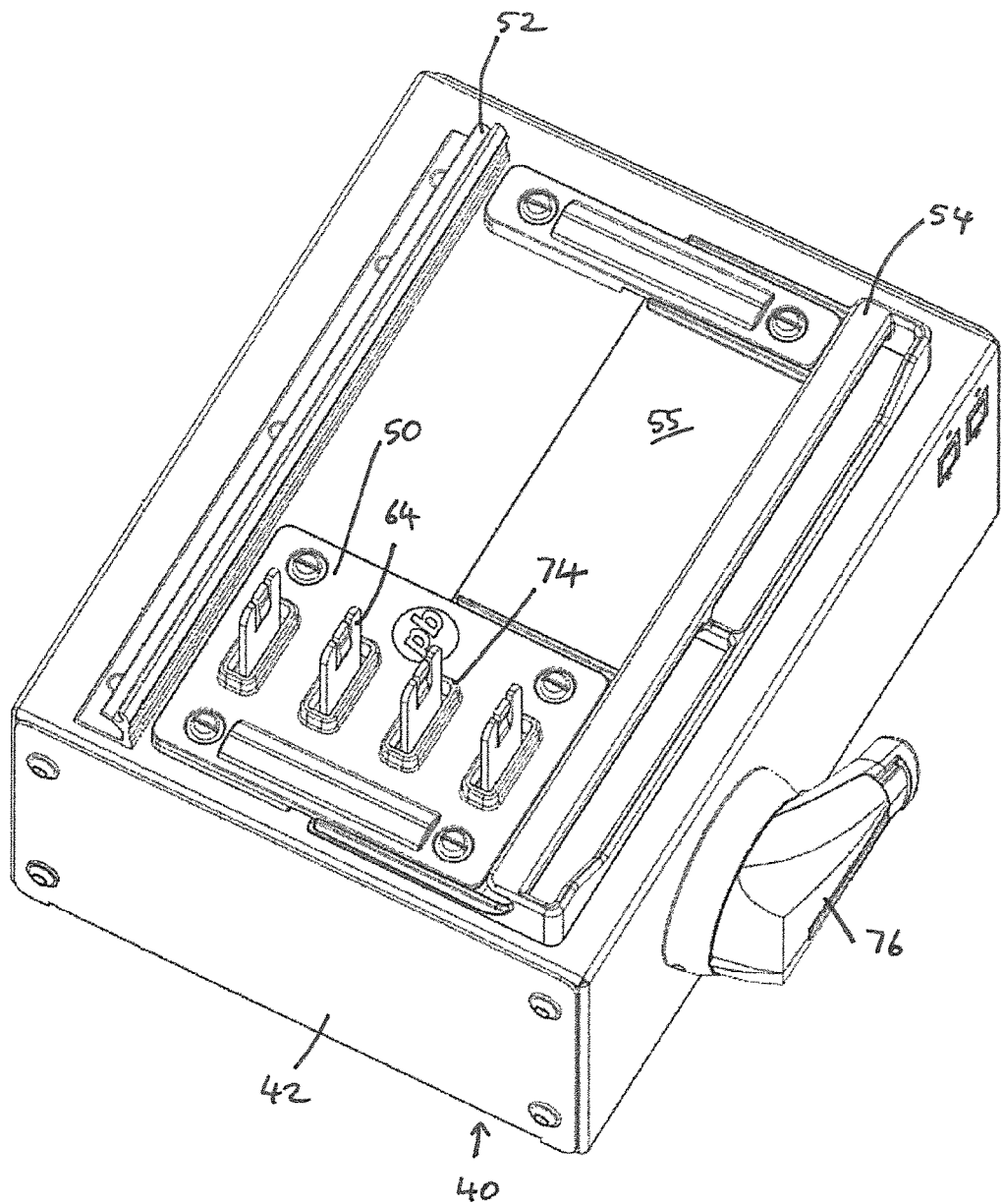
FIG. 10 is a perspective view of a tap off unit of the electrical distribution system of FIG. 1.

Each tap off unit 40 incorporates a plurality of male contacts 64 for engaging the busbars 14 within the busway sections 10, said contacts 64 being moveable between a retracted position, shown in FIGS. 6, 7 and 9, wherein said contacts 64 are located within the housing 42 of the tap off unit 40, and an extended position, shown in FIGS. 5 and 8, wherein said contacts 64 extend out of the housing 42 of the tap off unit 40 to engage the central slot 36 in a respective busbar 14 via said elongate openings 38 in the lower face of the respective busway section 10 (defined by the electrically insulating bodies 16) when the tap off unit 40 is mounted thereon.

The design of each tap off unit 40 advantageously prevents the male contacts 64 from being moved to their extended positions (from their retracted positions) to engage the busbars 14 unless the tap off unit 40 is secured to the respective busway section 10 via the locking mechanism of the respective tap off unit 40, more preferably unless the second retaining flange 54 is in its closed position.

Figure 11:
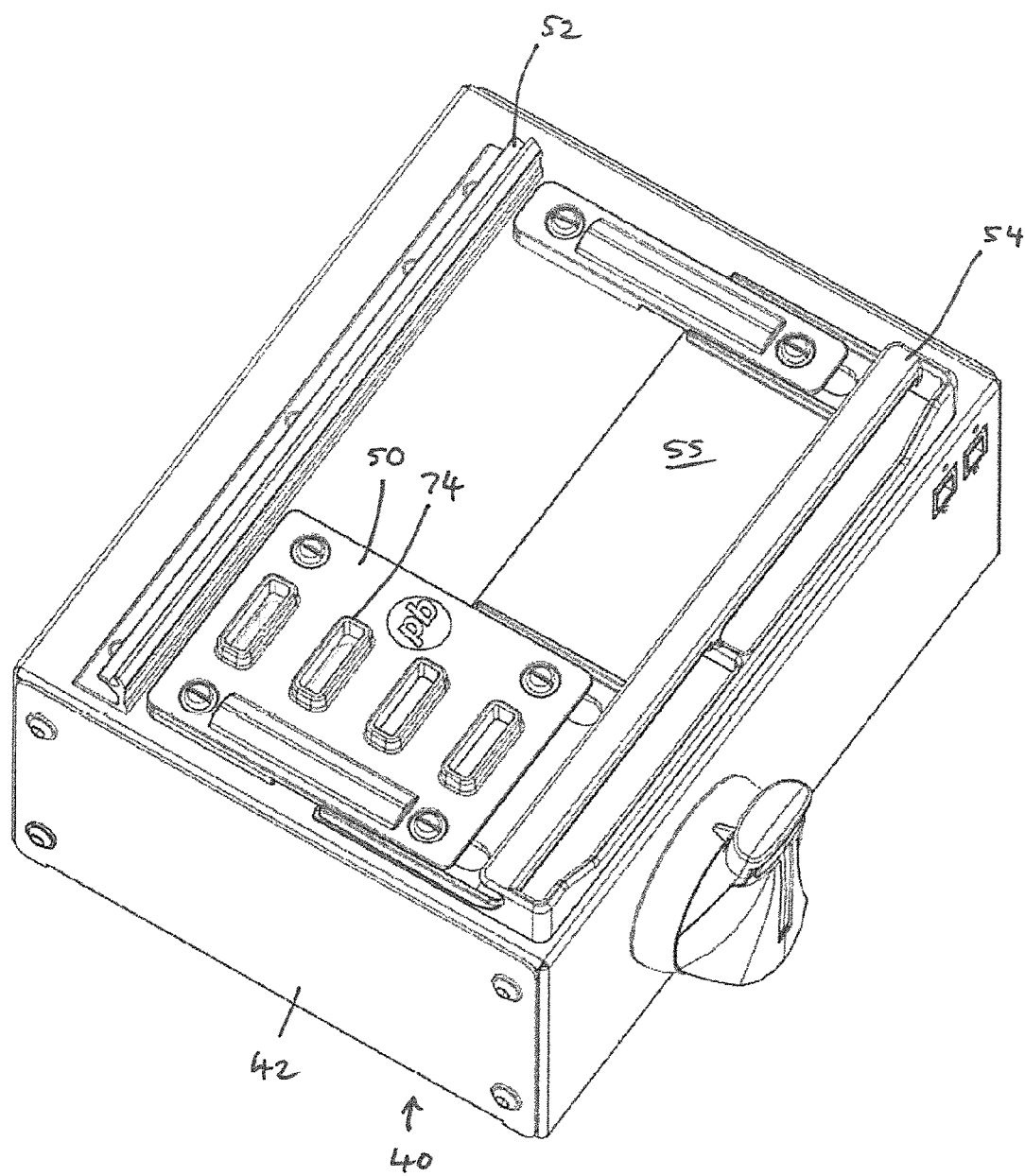
FIG. 11 is a perspective view of the tap off unit of FIG. 10 in a released configuration.
Figure 12:
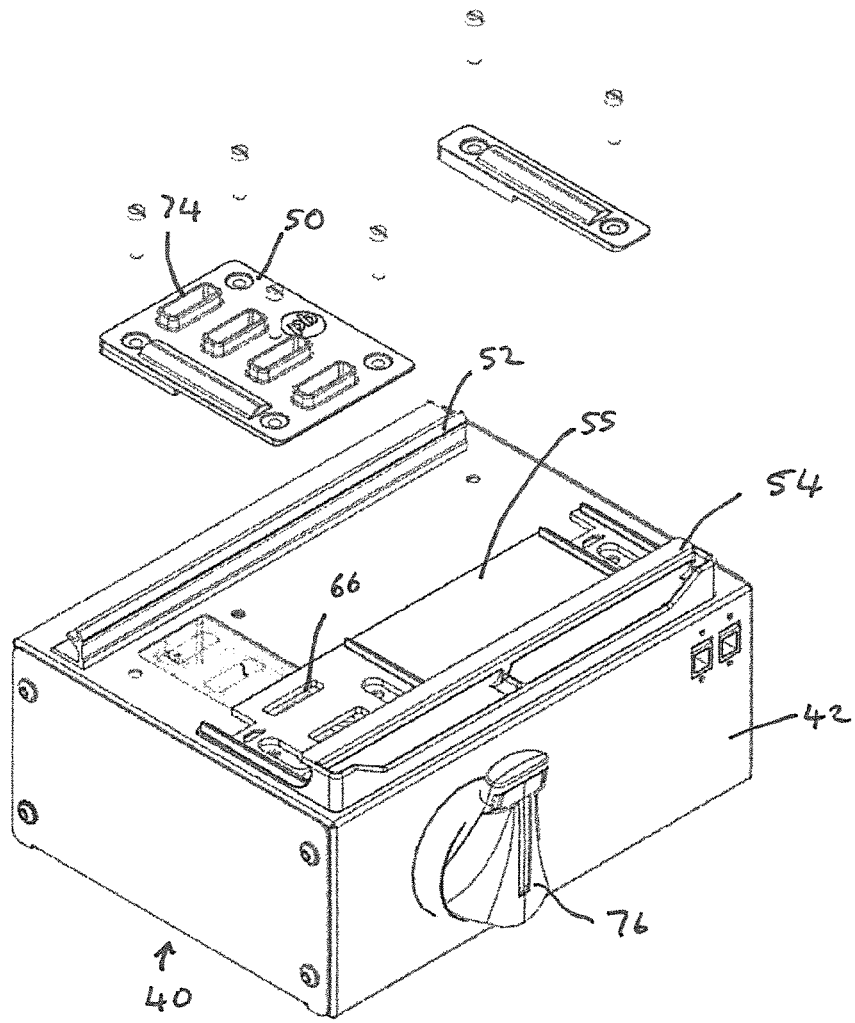
FIG. 12 is a partially exploded perspective view of the tap off unit of FIG. 10 in a released configuration.
Figure 13:
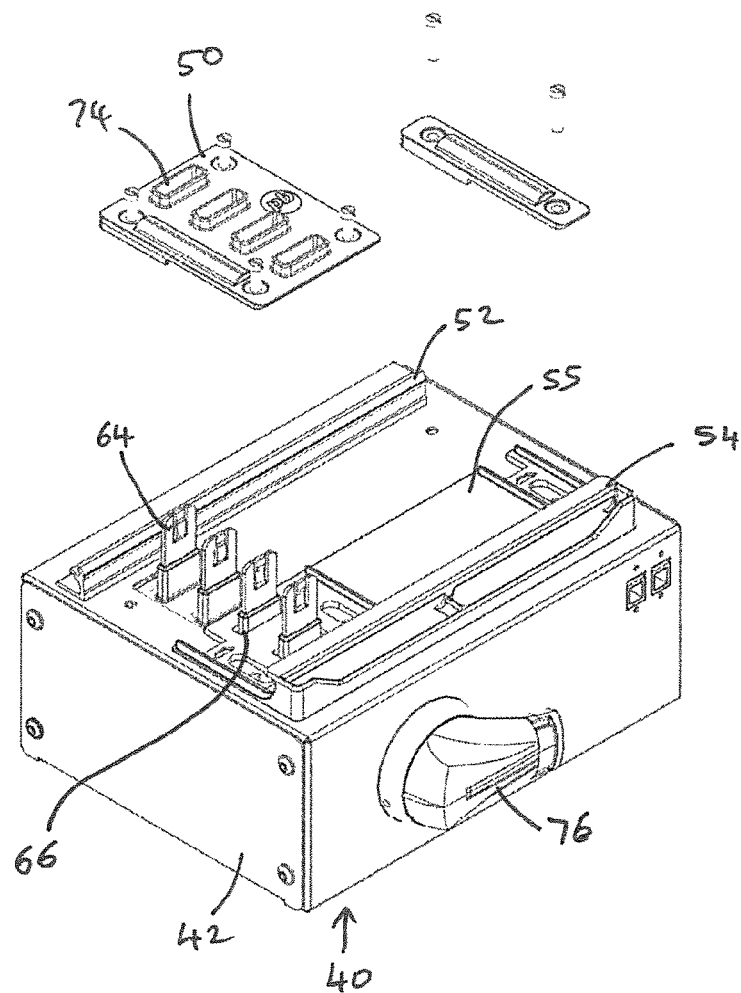
FIG. 13 is a partially exploded perspective view of the tap off unit of FIG. 10 in an operative configuration.
Figure 14:
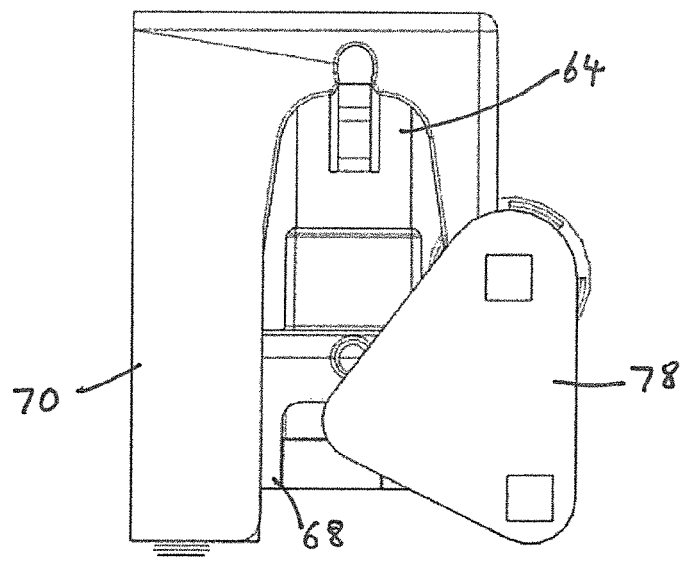
FIG. 14 is a detailed end view of the contact raising mechanism of the tap off unit of FIG. 10 with the contacts in a retracted position.
Figure 15:
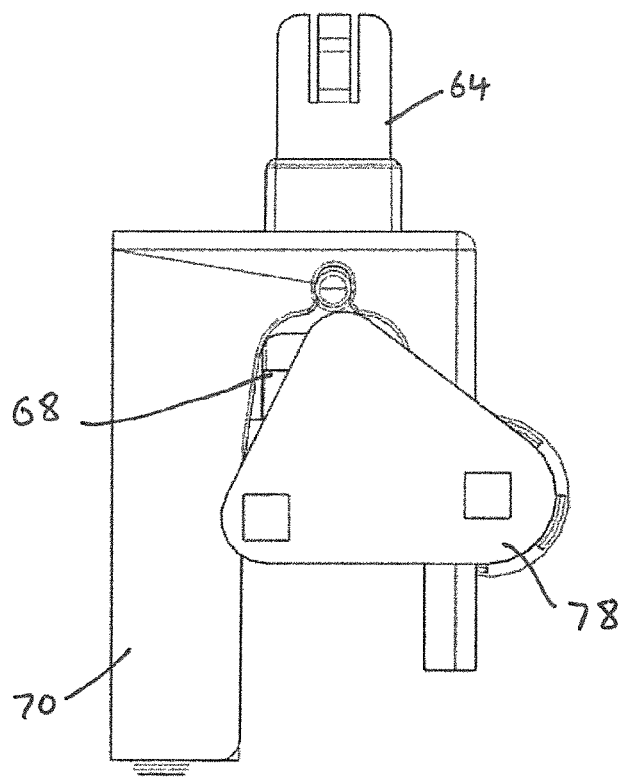
FIG. 15 is a detailed end view of the contact raising mechanism of the tap off unit of FIG. 10 with the contacts in an extended position.
Figure 16:
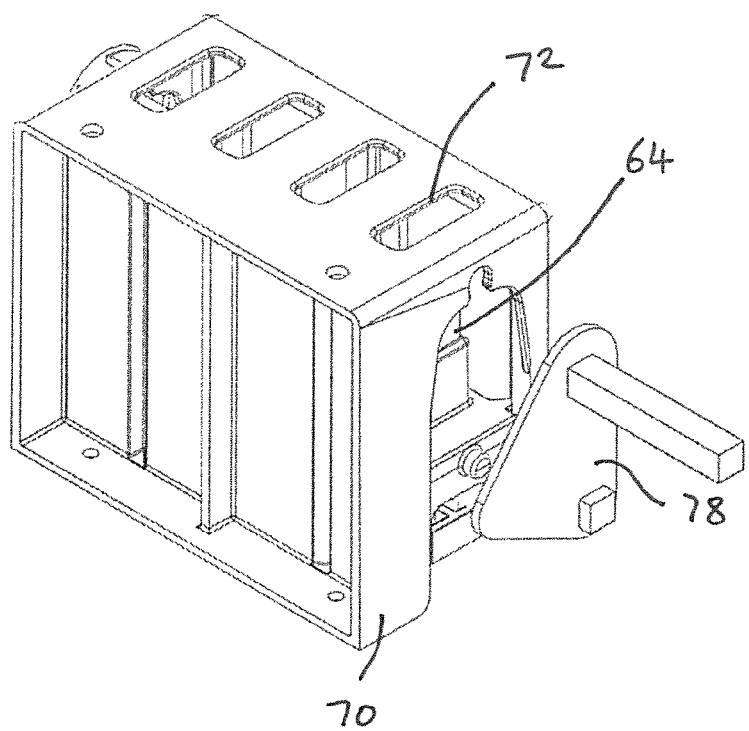
FIG. 16 is a detailed perspective view of the contact raising mechanism of the tap off unit of FIG. 10 with the contacts in a retracted position.
Figure 17:
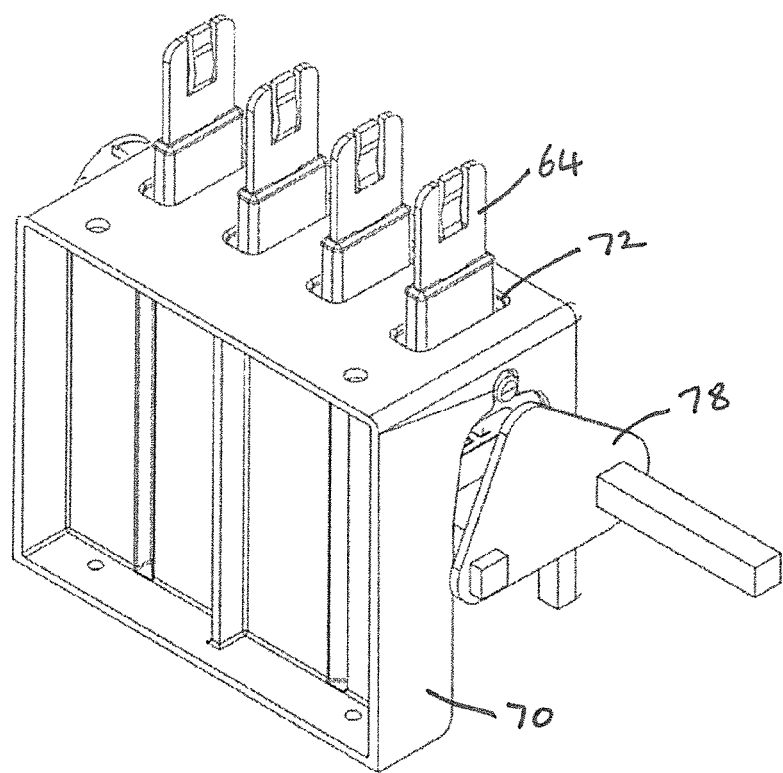
FIG. 17 is a detailed perspective view of the contact raising mechanism of the tap off unit of FIG. 10 with the contacts in an extended position.

This is achieved by means of the carrier plate 55 of the second retaining flange 54 being disposed between the housing 42 and the top plate 50 of the tap off unit 40, such that the carrier 55 is disposed in the path of one or more of the male contacts 64 as the male contacts 64 are moved between their retracted and extended positions. As best shown in FIGS. 11 to 13, slots 66 are provided in the carrier plate 55 through which said male contacts 64 may pass, such slots 66 being positioned to be aligned with respective ones of the male contacts 64 only when the second retaining flange 54 is in its closed position, such that the male contacts 64 can only be extended when the tap off unit 40 is secured to the respective busway section 10. When the second retaining flange is in its open position, the slots 66 in the carrier plate 55 are out of alignment with the male contacts 64 and thus prevent extension of the male contacts 64 between their retracted and extended positions.

As shown in FIGS. 14 to 17, the housing 42 of each tap off unit may include a lifting mechanism for extending and retracting the male contacts thereof into and out of engagement with the busbars 14 of the busway section 10 upon which the tap off unit 40 is mounted. In the embodiment shown in the drawings, the lifting mechanism comprises a slide 68, upon which the male contacts 64 are mounted, the slide 68 being slidably mounted within a guide body 70 positioned within the housing 42 of the tap off unit 40, whereby the slide 68 can be displaced within the guide body 70 between a lowered position, shown in FIGS. 12 and 14, wherein the male contacts 64 are retracted within the guide body 70, and a raised position, shown in FIGS. 13 and 15, wherein the male contacts 64 extend through apertures 72 formed in an upper face of the guide body 70 and through mutually aligned guide slots 74 formed in the top plate 50 of the tap off unit 40.

The slide 68 is moveable between its lowered and raised positions, to axially extend and retract the male contacts 64, by operation of a lifting lever 76 located on an outer side of the housing 42 of the tap off unit 40, said lifting lever 76 being operatively coupled to a pair of lever arms 78 pivotably mounted on either side of the housing 42 and engaging the slide 68, said lever arms 78 being rotatable by means of the lifting lever 76 through approximately 90° between a first position, wherein the slide 68 is supported in its lowered position, and a second position, wherein the slide 68 is supported in its raised position, to raise the contacts 64.

In an alternative embodiment, it is envisaged that the male contacts 64 may be pivotably movable or rotatable between their raised and lowered positions, rather than being axially slidable.

The invention is not limited to the embodiment(s) described herein but can be amended or modified without departing from the scope of the present invention.

The invention claimed is:

1. An electrical distribution system comprising:
   a busway section comprising an elongate trunking and a plurality of linear busbars disposed within the elongate trunking and supported in spaced parallel relationship to one another, wherein each busbar is aligned with a respective elongate opening in a mounting face of the busway section to permit access to engage the respective busbar; and
   a tap off unit comprising a housing arranged to be mounted on the busway section, abutting said mounting face thereof, at any desired location along a length of the busway section, the tap off unit having a plurality of electrically conductive busbar engaging male contacts being moveable between a retracted position, wherein said contacts are located within the housing of the tap off unit, and an extended position, wherein said contacts extend out of the housing of the tap off unit to engage a respective busbar via the respective elongate openings.

2. The electrical distribution system as claimed in claim 1, wherein the busbars are mounted within one or more electrically insulating bodies located within the busway section.

3. The electrical distribution system as claimed in claim 1, wherein the tap off unit is adapted to be mounted on the busway section to be supported thereon.

4. The electrical distribution system as claimed in claim 3, wherein the tap off unit is provided with one or more retaining members for engaging the busway section.

5. The electrical distribution system as claimed in claim 4, wherein at least one of said retaining members is moveable between a release position, wherein the tap off unit can be attached to and detached from the busway section, and an operative position, wherein the tap off unit is secured to the busway section by the retaining members.

6. The electrical distribution system as claimed in claim 5, wherein the tap off unit comprises a first retaining member located at or adjacent a first lateral side of the tap off unit, said first retaining member being adapted to engage a first retaining channel in the busway section at or adjacent a first lateral side thereof, and a second retaining member located at or adjacent a second lateral side of the tap off unit opposite said first lateral side, said second retaining member being adapted to engage a second retaining channel in the busway section at or adjacent a second lateral side thereof, opposite said first lateral side, at least one of said first and second retaining members being moveable between a release position, wherein the respective retaining member is spaced from the respective retaining channel, and an operative position, wherein the respective retaining member engages the respective retaining channel to retain the tap off unit in engagement with the busway section.

7. The electrical distribution system as claimed in claim 6, wherein the said first retaining member is fixed with respect to the tap off unit and said second retaining member is moveably mounted on the tap off unit to be moveable laterally between the release and operative positions.

8. The electrical distribution system as claimed in claim 7, wherein said first retaining member and the cooperating first retaining channel are shaped such that the tap off unit must be tilted with respect to the busway section to permit the insertion of said first retaining into or out of the first retaining channel.

9. The electrical distribution system as claimed in claim 8, wherein said first retaining member comprises an elongate flange adapted to engage the first retaining channel of the busway section.

10. The electrical distribution system as claimed in claim 9, wherein said elongate flange is curved laterally towards said first lateral side of the busway section so that the tap off unit must be tilted with respect to the busway section to initially insert the flange into the first retaining channel, the first retaining channel extending laterally towards said first lateral side of the busway section to allow the flange to enter into the first retaining channel as the tap off unit is rotated and raised into abutment with the mounting face of the busway section.

11. The electrical distribution system as claimed in claim 8, wherein the first retaining member forms an earth connection between the tap off unit and the busway section.

12. The electrical distribution system as claimed in claim 5, wherein said at least one moveable retaining member is provided on a laterally sliding plate mounted on or adjacent an outer face of the tap off unit, said plate having apertures therein, said apertures are aligned with one or more of said male contacts when the retaining member is in its operative position, such that said one or more male contacts may extend through said apertures when moving from their retracted to their extended positions, said apertures being positioned out of alignment with said one or more male contacts when the retaining member is in its release position, preventing extension of the male contacts from their retracted to their extended positions.

13. The electrical distribution system as claimed in claim 1, wherein said male contacts are moveable between their retracted and extended positions by means of a lever coupled to a cam mechanism engaging said male contacts.

14. The electrical distribution system as claimed in claim 1, wherein the busway section comprises a casing comprising an upper side and opposed lateral sides, a plurality of substantially parallel ribs depending from an inner face of said upper side to extend between the busbars, such that each busbar is located between a respective adjacent pair of said ribs.

15. The electrical distribution system as claimed in claim 14, wherein each rib has an enlarged head portion at a distal end thereof for retaining respective insulating bodies within the casing within which the plurality of busbars are mounted to be electrically insulated from said casing, said insulating bodies having lower openings defining the elongate openings of the busway section.

16. An electrical distribution system comprising:
a busway section comprising an elongate trunking and a plurality of linear busbars being disposed within the elongate trunking and being supported in spaced parallel relationship to one another; and
a tap off unit comprising a housing removably mounted to a mounting face of the busway section and configured to be mountable at a desired location of a plurality of mounting locations along a length of the busway section, wherein the tap off unit includes a plurality of male contacts being moveable between a retracted position, having the male contacts located within the housing of the tap off unit, and an extended position, wherein the male contacts extend out of the housing of the tap off unit and each engage a respective busbar of the plurality of linear busbars.

17. The electrical distribution system as claimed in claim 16, wherein the tap off unit includes a retaining member for removably engaging the busway section, the retaining member movable between a release position and an operative position that secures the tap off unit to the busway section.

18. The electrical distribution system as claimed in claim 17, wherein the plurality of male contacts are prevented from moving to the extended position when the retaining member is in the release position.

19. An electrical distribution system comprising:
a busway section comprising an elongate trunking and a plurality of busbars being disposed within the elongate trunking in spaced relationship to one another; and
a tap off unit comprising a housing removably engaged to a mounting face of the busway section and configured to be engagable at a desired location of a plurality of mounting locations on the busway section, wherein the tap off unit includes a plurality of male contacts being extendable from the housing of the tap off unit to each engage a respective busbar of the plurality of busbars, and wherein the plurality of male contacts are prevented from extending to engage the plurality of busbars when the tap off unit is disengaged from the mounting face of the busway section.

20. The electrical distribution system as claimed in claim 19, wherein the tap off unit includes a retaining member for removably engaging a lateral side of the busway section to support the tap off unit in engagement with the busway section.

* * * * *